(12) United States Patent
Sawant et al.

(10) Patent No.: US 7,858,680 B2
(45) Date of Patent: Dec. 28, 2010

(54) THERMOPLASTIC POLYCARBONATE COMPOSITIONS

(75) Inventors: Vitthal Abaso Sawant, Bangalore (IN); Srinivas Siripurapu, Minnetonka, MN (US); Raja Krishnamurthy, Bangalore (IN); Sandeep Tyagi, Maharashtra (IN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/344,714

(22) Filed: Dec. 29, 2008

(65) Prior Publication Data

US 2010/0168293 A1 Jul. 1, 2010

(51) Int. Cl.
*C08K 5/523* (2006.01)

(52) U.S. Cl. .................. 524/127; 524/140; 524/141

(58) Field of Classification Search .............. 524/127, 524/140, 141
See application file for complete search history.

(56) References Cited

U.S. PATENT DOCUMENTS

| | | | |
|---|---|---|---|
| 4,154,775 A | 5/1979 | Axelrod | |
| 5,357,022 A | 10/1994 | Banach et al. | |
| 5,596,048 A | 1/1997 | Blohm et al. | |
| 5,621,029 A | 4/1997 | Eckel et al. | |
| 6,790,887 B1 | 9/2004 | Nishihara | |
| 6,921,785 B2 * | 7/2005 | Campbell et al. | 524/127 |
| 2007/0065615 A1 * | 3/2007 | Odle et al. | 428/36.9 |
| 2007/0066740 A1 * | 3/2007 | Odle et al. | 524/430 |

2007/0208144 A1 9/2007 Delsman et al.

FOREIGN PATENT DOCUMENTS

| EP | 0732366 A2 | 9/1996 |
|---|---|---|
| EP | 1624025 A1 | 2/2006 |

OTHER PUBLICATIONS

ISO 11443, Plastics-Determination of the fluidity of plastics using capillary and slit-die rheometers, Second Edition Mar. 1, 2005, 40 pages.
ISO 180, Plastics-Determination of Izod impact strength, Third Edition Dec. 15, 2003, 16 pages.
UL94, Tests for Flammability of Plastic Materials for Parts in Devices and Appliances, Dec. 12, 2006, 52 pages.
International Search Report for International Application No. PCT/US2009/065320, maile Jan. 28, 2010, 6 pages.

* cited by examiner

*Primary Examiner*—Peter Szekely
(74) *Attorney, Agent, or Firm*—Cantor Colburn LLP

(57) ABSTRACT

Disclosed herein is a thermoplastic composition comprising:
a polycarbonate;
an impact modifier;
a polycarbonate-polysiloxane copolymer;
a poly(arylene ether)-polysiloxane copolymer; and
an organophosphate in an amount of 2 to 20 weight percent based on the combined weight of polycarbonate, impact modifier, polycarbonate-polysiloxane copolymer, and poly(arylene ether)-polysiloxane copolymer,
wherein the composition has a notched Izod impact strength of greater than or equal to 4 kilojoules per square meter ($kJ/m^2$) as determined according to ISO 180/A, a melt viscosity rate of less than or equal to 130 Pascal seconds (Pa·s) as determined according to ISO11443 at 1500 $s^{-1}$ and 280° C., and a UL94 rating of V1 or better at 0.8 millimeter thickness.

13 Claims, No Drawings

US 7,858,680 B2

THERMOPLASTIC POLYCARBONATE COMPOSITIONS

BACKGROUND OF THE INVENTION

This invention is directed to thermoplastic compositions comprising an aromatic polycarbonate, and in particular flame retardant thermoplastic polycarbonate compositions.

Polycarbonates are useful in the manufacture of articles and components for a wide range of applications, from automotive parts to electronic appliances. Because of their broad use, particularly in applications where flame retardance is important, there is a need for a combination of desirable melt flow, impact resistance and heat resistance while using flame retardants that are environmentally acceptable.

Melt flow is important to the ability to make a wide range of parts, particularly complex parts with areas of decreased thickness. Impact resistance is important in a range of applications as it is generally undesirable for a part to shatter on impact.

Polycarbonate compositions containing impact modifiers such as acrylonitrile-butadiene-styrene copolymer (ABS) can be particularly difficult to make flame retardant using environmentally acceptable flame retardants while maintaining other physical properties such as heat resistance. Additionally, some flame retardants can cause degradation of the thermoplastic composition.

There remains a need for flame retardant thermoplastic polycarbonate compositions that have excellent melt flow, impact properties, a flame retardance while using environmentally acceptable flame retardants.

SUMMARY OF THE INVENTION

The aforementioned problem is addressed by a thermoplastic composition comprising:
  a polycarbonate;
  an impact modifier;
  a polycarbonate-polysiloxane copolymer;
  a poly(arylene ether)-polysiloxane copolymer; and
  an organophosphate in an amount of 2 to 20 weight percent based on the combined weight of polycarbonate, impact modifier, polycarbonate-polysiloxane copolymer, and poly(arylene ether)-polysiloxane copolymer,
  wherein the composition has a notched Izod impact strength of greater than or equal to 4 kilojoules per square meter ($kJ/m^2$) as determined according to ISO 180/A, a melt viscosity rate of less than or equal to 130 Pascal seconds (Pa·s) as determined according to ISO 11443 at 1500 $s^{-1}$ and 280° C., and a UL 94 rating of V1 or better at 0.8 millimeter (mm) thickness.

An article may be formed by molding, extruding, shaping or forming such a composition to form the article.

The above-described and other features are exemplified by the following detailed description.

DETAILED DESCRIPTION OF THE INVENTION

Surprisingly it was found that using a combination of a polycarbonate-polysiloxane copolymer, a poly(arylene ether)-polysiloxane copolymer and an organophosphate in an impact modified polycarbonate composition yielded a composition with excellent impact strength, flow properties and flame retardance.

The composition has a notched Izod impact strength of 4 to 100 $kJ/m^2$ as determined by ISO 180/A. Within this range the notched Izod impact strength may be greater than or equal to 6, or, more specifically, greater than or equal to 10 $kJ/m^2$. Also within this range the notched Izod impact strength may be less than or equal to 60 $kJ/m^2$.

The composition has a melt viscosity of 130 to 35 Pa·s. Melt viscosity is determined by ISO 11443 at a shear rate of 1500 $s^{-1}$ and 280° C.

The composition has a UL 94 rating of V1 or better at 0.8 millimeters thickness. Additionally, the composition may have a UL 94 rating of V1 or better at 0.6 mm thickness. In some embodiments the composition may have a UL 94 rating of V0 at 0.6 millimeter thickness.

The composition may have a heat deflection temperature (HDT) of greater than or equal to 80° C., or more specifically, greater than or equal to 85° C., or, even more specifically, greater than or equal to 87° C. The heat deflection temperature can be less than or equal to 105° C. Heat deflection temperature is determined by ISO 75/A as described in the examples.

The three physical properties of melt flow, impact strength, and flame retardance, as described above, have been difficult to attain simultaneously. It is quite surprising that this combination of physical properties can be obtained with a composition comprising at least three materials which are believed to be immiscible with each other. It is generally thought that the use of immiscible materials, without a specific compatibilization strategy, leads to compositions with a diminished physical property profile.

As used herein, the term "polycarbonate" refers to a polymer comprising the same or different carbonate units, or a copolymer that comprises the same or different carbonate units, as well as one or more units other than carbonate (i.e. copolycarbonate); the term "aliphatic" refers to a hydrocarbon radical having a valence of at least one comprising a linear or branched array of carbon atoms which is not cyclic; "aromatic" refers to a radical having a valence of at least one comprising at least one aromatic group; examples of aromatic groups include phenyl, pyridyl, furanyl, thienyl, naphthyl, and the like; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "arylene" refers to a benzene ring diradical or to a benzene ring system diradical fused to at least one optionally substituted benzene ring; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; the modifier "about" used in connection with a quantity is inclusive of the stated value and has the meaning dictated by the context (e.g., includes the degree of error associated with measurement of the particular quantity); "optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present; and "direct bond", where part of a structural variable specification, refers to the direct joining of the substituents preceding and succeeding the variable taken as a "direct bond".

Compounds are described herein using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The various embodiments and ranges described herein are combinable to the extent that the description is not contradictory.

As used herein, the terms "polycarbonate" and "polycarbonate resin" mean compositions having repeating structural carbonate units of the formula (1):

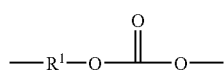
(1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced using dihydroxy compounds having the formula HO—$R^1$—OH, which includes dihydroxy compounds of formula (3)

$$HO-A^1-Y^1-A^2-OH \quad (3)$$

wherein $Y^1$, $A^1$ and $A^2$ are as described above. Exemplary dihydroxy compounds include bisphenol compounds of general formula (4):

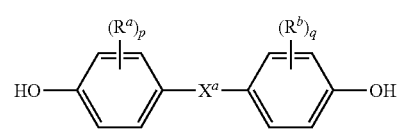
(4)

wherein $R^a$ and $R^b$ each represent a halogen atom or a monovalent hydrocarbon group and may be the same or different; p and q are each independently integers of 0 to 4; and $X^a$ represents one of the groups of formula (5):

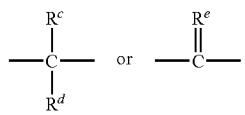
(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl)phthalimidine, 2-phenyl-3,3-bis(4- hydroxyphenyl)phthalimidine (PPPBP), and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents may be added at a level of 0.05 wt. % to 2.0 wt. %. All types of polycarbonate end groups are contemplated as being useful in the polycarbonate composition, provided that such end groups do not significantly affect desired properties of the thermoplastic compositions.

"Polycarbonates" and "polycarbonate resins" as used herein further includes blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6)

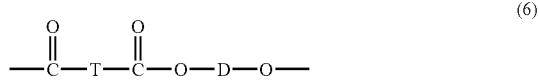

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 10:1 to 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In one specific embodiment, the polycarbonate is a linear homopolymer derived from bisphenol A, in which each of $A^1$ and $A^2$ is p-phenylene and $Y^1$ is isopropylidene.

Suitable polycarbonates can be manufactured by processes such as interfacial polymerization and melt polymerization.

In addition to the polycarbonates described above, it is also possible to use combinations of the polycarbonate with other thermoplastic polymers, for example combinations of polycarbonates and/or polycarbonate copolymers with polyesters. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), cycloaliphatic polyesters, and combinations comprising at least one of the foregoing polyesters. An exemplary cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD). Also contemplated are the above polyesters with a minor amount, e.g., from 0.5 to 10 percent by weight, of units derived from an aliphatic diacid and/or an aliphatic polyol to make copolyesters.

Blends and/or mixtures of more than one polycarbonate may also be used. For example, a high flow and a low flow polycarbonate may be blended together.

The composition comprises polycarbonate in an amount of 30 to 85 weight percent (wt. %), based on the total weight of the composition. Within this range the amount of polycarbonate can be greater than or equal to 40 wt. %, or, more specifically, greater than or equal to 50 wt. %. Also within this range the amount of polycarbonate can be less than or equal to 80 wt. %, or, more specifically, less than or equal to 75 wt. %.

The composition further includes one or more impact modifiers to increase the impact resistance of the thermoplastic composition. Useful impact modifiers include an elastomer-modified graft copolymers and silicone-acrylate copolymer. Elastomer-modified graft copolymers include copolymers comprising (i) an elastomeric (i.e., rubbery) polymer substrate having a Tg less than 10° C., more specifically less than −10° C., or more specifically −40° C. to −80° C., and (ii) a rigid polymeric superstrate grafted to the elastomeric polymer substrate. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Exemplary monovinylaromatic monomers used in the formation of the rigid graft phase include styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Exemplary comonomers for use in the rigid phase include acrylonitrile, ethacrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

Silicone-acrylate copolymers comprise structural units derived from at least one silicone rubber monomer, a branched acrylate rubber monomer having the formula $H_2C=C(R^g)C(O)OCH_2CH_2R^h$, wherein $R^g$ is hydrogen or a $C_{1-8}$ linear or branched hydrocarbyl group and $R^h$ is a branched $C_3$-$C_{16}$ hydrocarbyl group; a first graft link monomer; a polymerizable alkenyl-containing organic material; and a second graft link monomer. Exemplary silicone rubber monomers include cyclic siloxanes, tetraalkoxysilanes, trialkoxysilanes, (acryloxy)alkoxysilanes, (mercaptoalkyl) alkoxysilanes, vinylalkoxysilanes, or allylalkoxysilanes, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (9) or (10), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

Exemplary first graft link monomers include (acryloxy) alkoxysilanes, (mercaptoalkyl)alkoxysilanes, vinylalkoxysilanes, allylalkoxysilanes, and combinations of two or more of the foregoing e.g., (gamma-methacryloxypropyl) (dimethoxy)methylsilane and/or (3-mercaptopropyl)trimethoxysilane. The second graft link monomer is a polyethylenically unsaturated compound having at least one allyl group, such as allyl methacrylate, triallyl cyanurate, or triallyl isocyanurate, alone or in combination.

Processes known for the formation of the foregoing impact modifiers include mass, emulsion, suspension, and solution processes, or combined processes such as bulk-suspension, emulsion-bulk, bulk-solution or other techniques, using continuous, semibatch, or batch processes.

If desired, the foregoing types of impact modifiers may be prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-6}$, specifically a $C_{8-12}$ alkyl sulfonate. This emulsion polymerization process is described and disclosed in various patents and literature of such companies as Rohm & Haas and SABIC Innovative Plastics (formerly General Electric Company). In the practice, any of the above-described impact modifiers may be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES). The impact modifiers can also be used in combinations of two or more.

In some embodiments, the impact modifier is a graft polymer having a high rubber content, i.e., greater than or equal to 50 wt. %, optionally greater than or equal to 60 wt. % by weight of the graft polymer. The rubber is preferably present in an amount less than or equal to 95 wt. %, optionally less than or equal to 90 wt. % of the graft polymer.

The composition comprises an impact modifier in an amount of 1 to 15 wt. %, based on the total weight of the composition. Within this range the amount of impact modifier can be greater than or equal to 2 wt. %, or, more specifically, greater than or equal to 3 wt. %. Also within this range the amount of impact modifier can be less than or equal to 13 wt. %, or, more specifically, less than or equal to 10 wt. %.

The composition further comprises a polycarbonate-polysiloxane copolymer comprising polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (11) (sometimes referred to herein as 'siloxane'):

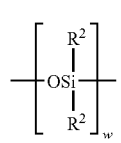

(11)

wherein each occurrence of $R^2$ is the same or different, and is a $C_{1-13}$ monovalent organic radical. For example, $R^2$ may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing $R^2$ groups may be used in the same copolymer.

The value of W in formula (11) may vary widely depending on the type and relative amount of each component in the thermoplastic composition, the desired properties of the composition, and like considerations. Generally, W may have an average value of 2 to 1000, specifically 2 to 500, more specifically 5 to 100. In one embodiment, W has an average value of 10 to 75, and in still another embodiment, W has an average value of 40 to 60. Where W is of a lower value, e.g., less than 40, it may be desirable to use a relatively larger amount of the polycarbonate-polysiloxane copolymer. Conversely, where W is of a higher value, e.g., greater than 40, it may be necessary to use a relatively lower amount of the polycarbonate-polysiloxane copolymer.

A combination of a first and a second (or more) polycarbonate-polysiloxane copolymers may be used, wherein the average value of W of the first copolymer is less than the average value of W of the second copolymer.

In one embodiment, the polydiorganosiloxane blocks are provided by repeating structural units of formula (12):

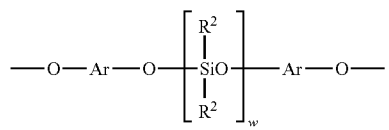

(12)

wherein W is as defined above; each $R^2$ may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (12) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl) propane. Combinations comprising at least one of the foregoing dihydroxy compounds may also be used.

Such units may be derived from the corresponding dihydroxy compound of formula (13):

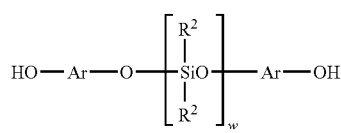

(13)

wherein $R^2$, Ar and W are as described above. Such compounds are further described in U.S. Pat. No. 4,746,701 to Kress et al. Compounds of this formula may be obtained by the reaction of a dihydroxyarylene compound with, for example, an alpha,omega-bisacetoxypolydiorangonosiloxane under phase transfer conditions.

In another embodiment the polydiorganosiloxane blocks comprise repeating structural units of formula (14):

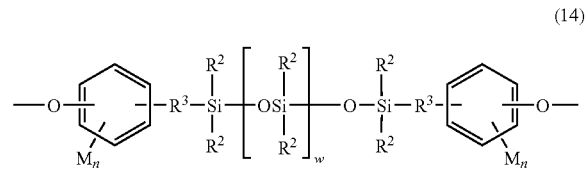

(14)

wherein $R^2$ and W are as defined above. $R^3$ in formula (14) is a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and $R^2$ is a $C_{1-8}$ alkyl, haloalkyl such as trifluoropropyl, cyanoalkyl, or aryl such as phenyl, chlorophenyl or tolyl. In another embodiment, $R^2$ is methyl, or a mixture of methyl and trifluoropropyl, or a mixture of methyl and phenyl. In still another embodiment, M is methoxy, n is one, $R^3$ is a divalent $C_1$-$C_3$ aliphatic group, and $R^2$ is methyl.

These units may be derived from the corresponding dihydroxy polydiorganosiloxane (15):

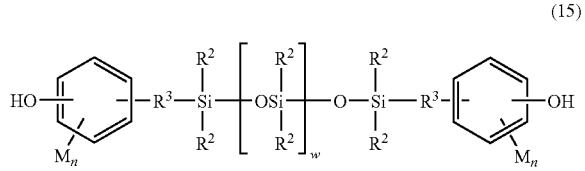

(15)

wherein $R^2$, W, M, $R^3$, and n are as described above.

The amount of polydiorganosiloxane units in the copolymer may vary widely, i.e., may be 1 wt. % to 99 wt. % of polydimethylsiloxane, or an equivalent molar amount of another polydiorganosiloxane, with the balance being carbonate units. The particular amounts used will therefore be determined depending on desired physical properties of the thermoplastic composition, the value of W (within the range of 2 to 1000), and the type and relative amount of each component in the thermoplastic composition, including the type and amount of polycarbonate, type and amount of impact modifier, type and amount of polycarbonate-polysiloxane copolymer, and type and amount of any other additives. For example, the amount of dihydroxy polydiorganosiloxane may be selected so as to produce a copolymer comprising 1 wt. % to 75 wt. %, or 1 wt. % to 50 wt. % polydimethylsiloxane, based on the total weight of the copolymer or an equivalent molar amount of another polydiorganosiloxane. The copolymer can comprise 5 wt. % to 40 wt. %, or 5 wt. % to 25 wt. % polydimethylsiloxane, or an equivalent molar amount of another polydiorganosiloxane, with the balance being polycarbonate.

The composition comprises a polycarbonate-polysiloxane copolymer in an amount of 2 wt. % to 25 wt. %, based on the total weight of the composition. Within this range the amount of the polycarbonate-polysiloxane copolymer can be greater than or equal to 5 wt. %, or, more specifically, greater than or equal to 7 wt. %. Also within this range the amount of the polycarbonate-polysiloxane copolymer can be less than or equal to 22 wt. %, or, more specifically, less than or equal to 20 wt. %.

The composition further comprises a poly(arylene ether)-polysiloxane copolymer. The poly(arylene ether)-polysiloxane copolymer is a block copolymer comprising a poly(arylene ether) block, a hydroxyaryl-terminated polysiloxane block, and a carbonate group linking the poly(arylene ether) block and the polysiloxane block. It will be understood that in the context of describing the poly(arylene ether)-polysiloxane copolymer, "hydroxyaryl-terminated polysiloxane block" refers to a block that does not include the hydroxy group hydrogen atom(s) of the reactant hydroxyaryl-terminated polysiloxane. In other words, in the context of the poly(arylene ether)-polysiloxane copolymer, the "hydroxyaryl-terminated polysiloxane block" may also be referred to as an "oxyaryl-terminated polysiloxane block".

There are several methods of making a poly(arylene ether)-polysiloxane copolymer. One method involves reacting a poly(arylene ether), a hydroxyaryl-terminated polysiloxane, and an oxidant. This method employs a process typically referred to as a redistribution. This method is described in U.S. Pat. No. 5,596,048. The redistribution method may be performed in solution or in melt. The poly(arylene ether)-polysiloxane copolymer can also be prepared by reacting a poly(arylene ether), a hydroxyaryl-terminated polysiloxane, and an activated aromatic carbonate. This reaction can also occur in a polymer melt (that is, in the absence of intentionally added solvent), or in solution (that is, in the presence of an intentionally added solvent). This method is described in U.S. Patent Publication No. 2007/0208144.

The poly(arylene ether) block comprises repeating units having the structure

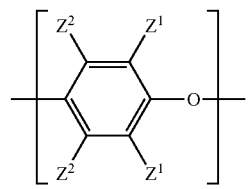

wherein for each repeating unit, each $Z^1$ is independently halogen, unsubstituted or substituted $C_1$-$C_{12}$ hydrocarbyl with the proviso that that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom. In one embodiment, each $Z^1$ is methyl, and each $Z^2$ is independently hydrogen or methyl. The poly(arylene ether) block can comprise 2,6-dimethyl-1,4-phenylene ether units, 2,3,6-trimethyl-1,4-phenylene ether units, or a combination thereof.

The polysiloxane block may comprise repeating units having the structure

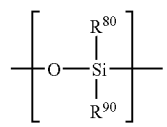

wherein each occurrence of $R^{80}$ and $R^{90}$ is independently hydrogen, $C_1$-$C_{12}$ hydrocarbyl, or $C_1$-$C_{12}$ halohydrocarbyl; and at least one terminus (end group) derived from the structure

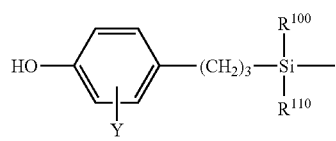

wherein Y is hydrogen, $C_1$-$C_{12}$ hydrocarbyl, $C_1$-$C_{12}$ hydrocarbyloxy, or halogen, and wherein each occurrence of $R^{100}$ and $R^{110}$ is independently hydrogen, $C_1$-$C_{12}$ hydrocarbyl, or $C_1$-$C_{12}$ halohydrocarbyl. In one embodiment, each occurrence of $R^{80}$, $R^{90}$, $R^{100}$, and $R^{110}$ is independently methyl or phenyl, and Y is methoxy. The polysiloxane block may also comprise one or more branching units such as, for example, those resulting from the use of one or more monomers such as $CH_3SiCl_3$, $CH_3Si(OCH_2CH_3)_3$, $SiCl_4$, and $Si(OCH_2CH_3)_4$ during synthesis of the polysiloxane. Thus, the polysiloxane may, optionally, further comprise one or more of the branching units

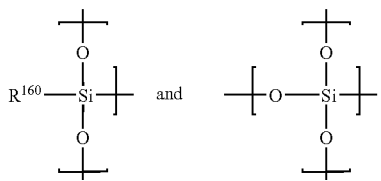

wherein each occurrence of $R^{160}$ is independently at each occurrence hydrogen, $C_1$-$C_{12}$ hydrocarbyl, or $C_1$-$C_{12}$ halohydrocarbyl.

The poly(arylene ether)-polysiloxane block copolymer may comprise polysiloxane in an amount of 5 to 50 weight percent, based on the total weight of the copolymer. Within this range the polysiloxane content can be greater than or equal to 10 weight percent, or more specifically, greater than or equal to 20 weight percent, or, even more specifically, greater than or equal to 25 weight percent. Also within this range the polysiloxane content can be less than or equal to 40 weight percent, or more specifically, less than or equal to 35 weight percent.

The structure of the poly(arylene ether)-polysiloxane block copolymer may take a variety of forms. For example, the poly(arylene ether)-polysiloxane block copolymer may be a diblock copolymer, a triblock copolymer, a linear multiblock copolymer having more than three blocks, or a radial teleblock copolymer. In one embodiment, the poly(arylene ether)-polysiloxane block copolymer is a poly(arylene ether)-polysiloxane-poly(arylene ether) triblock copolymer.

In some embodiments the poly(arylene ether) block has an intrinsic viscosity of about 0.04 to about 0.6 deciliters per gram at 25° C. in chloroform and comprises 2,6 dimethyl-1,4-phenylene ether units, 2,3,6-trimethyl-1,4-phenylene ether units, or a combination thereof. Additionally, the polysiloxane block has a number average molecular weight of about 1,000 to about 8,000 atomic mass units, and has the structure

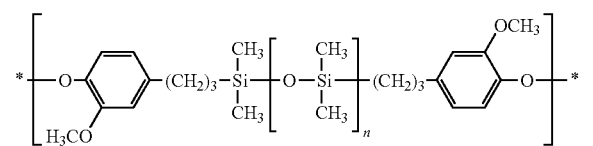

wherein n is about 5 to about 200. The number average molecular weight of the polysiloxane block can be less than or equal to 5,000 atomic mass units.

The composition comprises a poly(arylene ether)-polysiloxane copolymer in an amount of 2 to 20 wt. %, based on the total weight of the composition. Within this range the amount of the poly(arylene ether)-polysiloxane copolymer can be greater than or equal to 3 wt. %, or, more specifically, greater than or equal to 5 wt. %. Also within this range the amount of poly(arylene ether)-polysiloxane copolymer can be less than or equal to 15 wt. %, or, more specifically, less than or equal to 12 wt. %.

The composition may have a total siloxane content of 1 to 10 weight percent based on the total weight of the composition. Within this range the total siloxane content may be greater than or equal to 2 weight percent. Also within this range the total siloxane content may be less than or equal to 5 weight percent. Total siloxane content is the sum of the siloxane content contributed by the polycarbonate-polysiloxane copolymer and the poly(arylene ether)-polysiloxane copolymer.

As mentioned above the composition comprises an organophosphate. One type of exemplary organophosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable organophosphates include phenyl bis(dodecyl)phosphate, phenyl bis(neopentyl)phosphate, phenyl bis(3,5,5'-trimethylhexyl) phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl) phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific organophosphate is one in which each G is aromatic, for example, triphenyl phosphate, tricresyl phosphate, isopropylated triphenyl phosphate, and the like.

The organophosphate may comprise a di- or polyfunctional aromatic phosphorus-containing compound, for example, compounds of the formulas below:

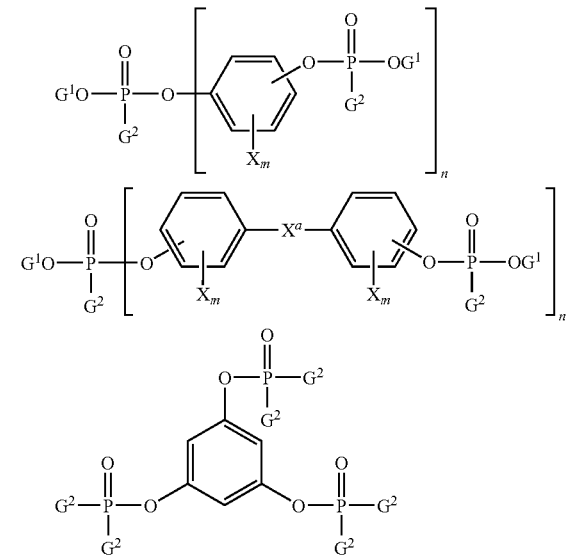

wherein each $G^1$ is independently a hydrocarbon having 1 to 30 carbon atoms; each $G^2$ is independently a hydrocarbon or hydrocarbonoxy having 1 to 30 carbon atoms; each $X^a$ is as defined above; each X is independently a bromine or chlorine; m is 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl) phosphate of bisphenol-A, respectively, their oligomeric and polymeric counterparts, and the like.

The organophosphate is present in an amount of 2 to 20 wt. %, based on the total weight of the composition. Within this range the amount of organophosphate can be greater than or equal to 3 wt. %, or, more specifically, greater than or equal to 5 wt. %. Also within this range the amount of organophosphate can be less than or equal to 15 wt. %, or, more specifically, less than or equal to 12 wt. %.

The composition also may comprise an aromatic vinyl copolymer. The aromatic vinyl copolymer contains a comonomer, such as vinyl monomers, acrylic monomers, maleic anhydride and derivates derivatives?, and the like, and combinations thereof. As defined herein, vinyl monomers are aliphatic compounds having at least one polymerizable carbon-carbon double bond. When two or more carbon-carbon double bonds are present, they may be conjugated to each other, or not. Suitable vinyl monomers include, for example, ethylene, propylene, butenes (including 1-butene, 2-butene, and isobutene), pentenes, hexenes, and the like; 1,3-butadiene, 2-methyl-1,3-butadiene (isoprene), 1,4-pentadiene, 1,5-hexadiene, and the like; and combinations thereof.

Acrylic monomers include, for example, acrylonitrile, ethacrylonitrile, methacrylonitrile, α-chloroarylonitrile, β-chloroacrylonitrile, α-bromoacrylonitrile, and β-bromoacrylonitrile, methyl acrylate, methyl methacrylate, ethyl acrylate, butyl acrylate, propylacrylate, isopropyl acrylate, and the like, and mixtures thereof.

Maleic anhydride and derivatives thereof include, for example, maleic anhydride, maleimide, N-alkyl maleimide, N-aryl maleimide or the alkyl- or halo-substituted N-arylmaleimides, and the like, and combinations thereof.

The amount of comonomer(s) present in the aromatic vinyl copolymer can vary. However, the level is generally present at a mole percentage of 2% to 75%. Within this range, the mole percentage of comonomer may specifically be at least 4%, more specifically at least 6%. Also within this range, the mole percentage of comonomer may specifically be up to 50%, more specifically up to 25%, even more specifically up to 15%. Specific polystyrene copolymer resins include poly (styrene maleic anhydride), commonly referred to as "SMA" and poly(styrene acrylonitrile), commonly referred to as "SAN".

The weight average molecular weight (Mw) of the aromatic vinyl copolymer can be 30,000 to 200,000, optionally 30,000 to 110,000, measured by gel permeation chromatography.

The composition may comprise 2 wt. % to 25 wt. % aromatic vinyl copolymer, based on the total weight of the composition. Within this range the aromatic vinyl copolymer can be present in an amount greater than or equal to 5 wt. %, or, more specifically greater than or equal to 7.5 wt. %. Also within this range the aromatic vinyl copolymer can be present in an amount less than or equal to 20 wt. %, or, more specifically, less than or equal to 15 wt. %, or, more specifically, less than or equal to 10 wt. %.

The thermoplastic composition may include various additives ordinarily incorporated in resin compositions or blends of this type, with the proviso that the additives are preferably selected so as to not significantly adversely affect the desired properties of the thermoplastic composition. Mixtures of additives may be used. Such additives may be mixed at a suitable time during the mixing of the components for forming the composition. Exemplary additives include fillers and/or reinforcing agents, antioxidants, heat stabilizers, light stabilizers, UV absorbing additives, plasticizers, lubricants, mold release agents, anti-static agents, colorants, dyes, anti-drip agents, blowing agents, nucleating agents, and combinations of two or more of the foregoing additives.

The thermoplastic compositions may be manufactured by methods generally available in the art, for example, in one embodiment, powdered polycarbonate resin, impact modifier, polycarbonate-polysiloxane copolymer, poly(arylene ether)-polysiloxane copolymer and organophosphate are first blended, optionally with any fillers or additives in a Henschel™ high speed mixer or other suitable mixer/blender. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a side-stuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the polycarbonate compositions may be used for such applications as automotive parts, including panel and trim, spoilers, luggage doors, body panels, as well as walls and structural parts in recreation vehicles.

The compositions are further illustrated by the following non-limiting examples, which were prepared from the components set forth in Table 1.

TABLE 1

| Component | Supplier, Grade | Description |
|---|---|---|
| PC-1 | SABIC Innovative Plastics | Bisphenol A polycarbonate having a melt volume rate (MFR) of 5.1-6.9 cc/10 minutes measured at 300° C. and 1.2 kilograms load (Low Flow) |
| PC-2 | SABIC Innovative Plastics | Bisphenol A polycarbonate having a melt flow rate (MFR) of 6-14 cc/10 minutes measured at 300° C. and 1.2 kilograms load (High Flow) |
| PC-ST | SABIC Innovative Plastics | Bisphenol A polycarbonate-polydimethylsiloxane copolymer (20 wt % siloxane) |
| ABS (bulk) | SABIC | Bulk emulsion polymerized |

TABLE 1-continued

| Component | Supplier, Grade | Description |
|---|---|---|
| | Innovative Plastics | poly(acrylonitrile-co-butadiene-co-styrene) comprising 15-35 weight percent polyacrylonitrile and 85-65 weight percent polystyrene grafted on to a core of 85-100 weight percent polybutadiene and with a 15-0 weight percent styrene; the core represents 25-75% of the total emulsion ABS; the materials are crosslinked to a density of 43-55% as measured by sol-gel fraction. |
| TSAN | SABIC Innovative Plastics | PTFE encapsulated 72:28 w/w styrene-acrylonitrile copolymer |
| RDP | Supresta, New York USA | Resorcinol tetraphenyl diphosphate |
| BPADP | Supresta, New York USA | Bis(diphenyl) phosphate of bisphenol A |
| PPE | SABIC Innovative Plastics | Poly(2,6-dimethyl-1,4-phenylene ether) (intrinsic viscosity 0.49 dl/g in chloroform at 25° C.) |
| Eu—Si (Siloxane) | Momentive Performance Materials Waterford, USA. | Eugenol capped siloxane liquid ($D_{45}$, CF2003 |
| PPE-Si (solution) (60/40) | | PPE-Si copolymer made by solution route (40 wt % of siloxane) as described below |
| PPE-Si (solution) (70/30) | | PPE-Si copolymer made by solution route (30 wt % of siloxane) as described below |
| PPE-Si (extrusion) (90/10) | | PPE-Si copolymer made by extrusion route (10 wt % of siloxane) as described below |
| PPE-Si (extrusion) (95/5) | | PPE-Si copolymer made by extrusion route (5 wt % of siloxane) as described below |

Method for the preparation of the PPE-Si (solution) (60/40) copolymer: PPE (60 g) was dissolved in 120 milliliters (ml) of anhydrous toluene in a three-necked round bottom flask equipped with a stir bar, a condenser and a nitrogen inlet. Calculated amount (40 grams (g)) of Eu—Si ($D_{45}$, CF2003) was added drop-wise to above solution under vigorous stirring at room temperature. The reaction temperature was subsequently raised to 80-90° C. and benzoyl peroxide (BPO) (1 g) dissolved in toluene (10 ml) was added to it, for a period of 1 hour. The reaction was continued for another 7 hours. The homogenous solution thus obtained was precipitated in methanol (2000 ml), with vigorous stirring. The white powdery solid thus obtained was dried overnight under vacuum at 80° C. The yield of the free flowing powdery solid product was 89 g (87%).

Method for the preparation of the PPE-Si (solution) (70/30) copolymer: PPE (70 g) was dissolved in anhydrous toluene (120 ml) in a three-necked round bottom flask equipped with a stir bar, a condenser and a nitrogen inlet. Calculated amount (30 g) of Eu—Si—was added drop-wise to above solution under vigorous stirring at room temperature. The reaction temperature was subsequently raised to 80-90° C. and BPO (1 g) dissolved in toluene (10 ml) was added to it, for a period of 1 hour. The reaction was continued for another 7 hours. The homogenous solution thus obtained was precipitated in methanol (2000 ml), with vigorous stirring. The white powdery solid thus obtained was dried overnight under vacuum at 80° C. The yield of the free flowing powdery solid product was 89 g (87%).

Method for the preparation of the PPE-Si (extrusion) (90/10) copolymer: The synthesis of PPE-siloxane copolymer by reactive extrusion was accomplished using a ZSK-25 mega compounder (L/D=25.52). Most of the experiments were carried out in a ten-barrel set-up extruder. The ingredients (PPE 90 g, Eu—Si 10 g and dicumyl peroxide (DCP) 1 g) were weighed in a plastic bag, transferred to a high-speed mixer and thoroughly mixed at room temperature to ensure homogeneity. All the components were fed upstream using a single vibratory feeder. Atmospheric vent was provided in sixth barrel and a vacuum equivalent to 200 millibars (mbar) was applied at ninth barrel. The throughput was maintained at 7 kilograms (kg) per hour at 300 rpm, unless specified otherwise.

Method for the preparation of PPE-Si (extrusion) (95/5) copolymer: The synthesis of PPE-siloxane copolymer by reactive extrusion was accomplished using a ZSK-25 mega compounder (L/D=25.52). Most of the experiments were carried out in a ten-barrel set-up extruder. Typically, the ingredients (PPE—95 g, Eu—Si—5 g and DCP—1 g) were weighed in a plastic bag, transferred to a high-speed mixer and thoroughly mixed at room temperature to ensure homogeneity. All the components were fed upstream using a single vibratory feeder. Atmospheric vent was provided in sixth barrel and a vacuum equivalent to 200 mbar was applied at ninth barrel. The throughput was maintained at 7 kg per hour at 300 rpm, unless specified otherwise.

The compositions were made by feeding a mixture of all the ingredients in the extruder feed throat. The extruder was a twin-screw extruder having a screw diameter 25 mm and L/D of 40. The extruder was typically operated at a temperature of 180 to 385° C., specifically 200 to 330° C., or, more specifically, 220 to 300° C. The die temperature may have been different from the barrel temperature. The extruded thermoplastic composition was quenched in water and pelletized. The compositions were subsequently injection molded.

The compositions were tested for one or more of the following: UL 94 flame retardance, Izod impact strength, melt viscosity, spiral flow, heat deflection temperature, tensile modulus, stress at yield and elongation at break. The details of these tests used in the examples are known to those of ordinary skill in the art, and may be summarized as follows:

Flammability tests were performed following the procedure of Underwriter's Laboratory Bulletin 94 entitled "Tests for Flammability of Plastic Materials, UL 94". Several ratings can be applied based on the rate of burning, time to extinguish, ability to resist dripping, and whether or not drips are burning. Samples for testing are bars having dimensions of 125 mm length×13 mm width by no greater than 13 mm thickness. Bar thicknesses were 0.6 mm or 0.8 mm. Materials can be classified according to this procedure as UL 94 HB (horizontal burn), V0, V1, V2, 5VA and/or 5VB on the basis of the test results obtained for five samples; however, the compositions herein were tested and classified only as V0, V1, and V2, the criteria for each of which are described below.

V0: In a sample placed so that its long axis is 180 degrees to the flame, the period of flaming and/or smoldering after removing the igniting flame does not exceed ten (10) seconds and the vertically placed sample produces no drips of burning particles that ignite absorbent cotton. Five bar flame out time is the flame out time for five bars, each lit twice, in which the sum of time to flame out for the first ($t_1$) and second ($t_2$) ignitions is less than or equal to a maximum flame out time ($t_1+t_2$) of 50 seconds.

V1: In a sample placed so that its long axis is 180 degrees to the flame, the period of flaming and/or smoldering after removing the igniting flame does not exceed thirty (30) seconds and the vertically placed sample produces no drips of burning particles that ignite absorbent cotton. Five bar flame out time is the flame out time for five bars, each lit twice, in which the sum of time to flame out for the first ($t_1$) and second ($t_2$) ignitions is less than or equal to a maximum flame out time ($t_1+t_2$) of 250 seconds.

V2: In a sample placed so that its long axis is 180 degrees to the flame, the average period of flaming and/or smoldering after removing the igniting flame does not exceed thirty (30) seconds, but the vertically placed samples produce drips of burning particles that ignite cotton. Five bar flame out time is the flame out time for five bars, each lit twice, in which the sum of time to flame out for the first ($t_1$) and second ($t_2$) ignitions is less than or equal to a maximum flame out time ($t_1+t_2$) of 250 seconds.

Izod Impact Strength is used to compare the impact resistances of plastic materials. NII was determined at 23° C. using a 4-mm thick, molded, notched Izod impact bar. It was determined per ISO 180/A. The ISO designation reflects type of notch: ISO 180/A means notch type A. ISO 180/U standard was used to determine un-notched Izod impact (UNI). The ISO results are defined as the impact energy in joules used to break the test specimen, divided by the specimen area at the notch. Results are reported in kJ/m².

Melt viscosity is a measure of a polymer at a given temperature at which the molecular chains can move relative to each other. Melt viscosity may be dependent on the molecular weight, in that the higher the molecular weight, the greater the entanglements and the greater the melt viscosity. Melt viscosity is determined against different shear rates, and was determined by ISO 11443. The melt viscosity was measured at 280° C. at shear rate of 1500 s$^{-1}$. Results are reported in Pascal seconds (Pa·s).

Spiral flow length testing was performed according to the following procedure. A molding machine with a barrel capacity of 3 to 5 ounces (85 to 140 g) and channel depths of 0.03, 0.06, 0.09, or 0.12 inches (0.76, 1.52, 2.29, or 3.05 mm, respectively) was loaded with pelletized thermoplastic composition. The mold and barrel were heated to a temperature suitable to flow the polymer, typically about 270° C. The thermoplastic composition, after melting and temperature equilibration, is injected into the selected channel of the mold at 580 pounds per square inch (psi) (4 MPa) for a minimum flow time of 6 seconds, at a rate of 6.0 inches (15.24 cm) per second, to allow for maximum flow prior to gate freeze. Successive samples are generated using a total molding cycle time of 35 seconds. Samples are retained for measurement either after 10 runs have been completed, or when successively prepared samples are of consistent size. Five samples are then collected and measured to within the nearest 0.25 inches (0.64 cm), and a median length for the five samples is reported. As reported herein, spiral flow was determined at 270° C., 580-psi fill pressure, 6-second injection, with 3.2 mm wall thickness.

Heat deflection temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. HDT was determined per ISO 75/A, using a flat, 4 mm thick bar, molded tensile bar subjected to 1.8 MPa. Results are reported in ° C.

Tensile properties such as tensile modulus, stress at yield and elongation at break and elastic modulus were determined using 4 mm thick molded tensile bars tested per ISO 527 at a pull rate of 1 mm/min. until 5% strain, followed by a rate of 50 mm/min. until the sample broke. It is also possible to measure at 5 mm/min. if desired for the specific application, but the samples measured in these experiments were measured at 50 mm/min. Tensile Strength results are reported as MPa, and tensile elongation at break is reported as a percentage. Elastic modulus is reported in gigapascals (GPa).

EXAMPLES 1-8

The compositions as shown in Table 2 were made by melt mixing in a twin-screw lab scale extruder as described above. The amounts in Table 2 are shown in weight percent based on the total weight of the composition. In addition to the components shown in the Table 2 each example also contained 0.5 weight percent of stabilizers.

TABLE 2

|  | 1* | 2* | 3* | 4* | 5 | 6 | 7 | 8 |
|---|---|---|---|---|---|---|---|---|
| PC-2 | 65.82 | 55.82 | 55.82 | 55.82 | 55.82 | 55.82 | 55.82 | 55.82 |
| PC-1 | 5.7 | 5.7 | 5.7 | 5.7 | 5.7 | 5.7 | 5.7 | 5.7 |
| TSAN | 1.0 | 1.0 | 1.0 | 1.0 | 1.0 | 1.0 | 1.0 | 1.0 |
| BPADP | 10 | 10 | 10 | 10 | 10 | 10 | 10 | 10 |
| PC-ST | 14.0 | 14.0 | 14.0 | 14.0 | 14.0 | 14.0 | 14.0 | 14.0 |
| ABS (bulk) | 3.0 | 3.0 | 3.0 | 3.0 | 3.0 | 3.0 | 3.0 | 3.0 |
| PPE | — | 10 | 7 | 9 | — | — | — | — |

TABLE 2-continued

|  | 1* | 2* | 3* | 4* | 5 | 6 | 7 | 8 |
|---|---|---|---|---|---|---|---|---|
| Si (Siloxane) | — | — | 3 | 1 | — | — | — | — |
| PPE-Si (extrusion) (90/10) | — | — | — | — | 10 | — | — | — |
| PPE-Si (extrusion) (95/5) | — | — | — | — | — | 10 | — | — |
| PPE-Si (solution) (60/40) | — | — | — | — | — | — | 10.0 | — |
| PPE-Si (solution) (70/30) | — | — | — | — | — | — | — | 10.0 |
| UL 94 rating at 0.6 mm thickness | V2 | V2 | V2 | V2 | V0 | V1 | V0 | V1 |
| Total (t1 + t2) in seconds | NA | NA | NA | NA | 25 | 150 | 48 | 76 |
| UL 94 rating at 0.8 mm thickness | V0 | V1 | V1 | V1 | V0 | V0 | V0 | V0 |
| Total (t1 + t2) in seconds | 22 | 62 | 67 | 57 | 11 | 32 | 39 | 22 |
| Spiral flow | 474 | 478 | 527 | 475 | 505 | 490 | 583 | 552 |
| Melt viscosity | 140 | 156 | 102 | 110 | 112 | 113 | 100 | 102 |
| Notched Izod impact (NII) | 9 | 2.9 | 4.6 | 5.1 | 5.9 | 4.1 | 11.5 | 10.3 |
| Un-notched Izod impact (UNI) | NB** | 49 | 51 | 40 | 31 | 24 | 125.0 | NB |
| Heat deflection temperature (HDT) | 83 | NT*** | NT | NT | 87.0 | 88.0 | 88.9 | 89.2 |

*Comparative Example
**NB: not broken
***NT: not tested

Example 1 is a comparative example which contains no poly(arylene ether) or polysiloxane of any type and provides a baseline comparison for the remaining examples in terms of flammability and physical properties. Example 2 is a comparative example which demonstrates the effect of replacing a portion of the polycarbonate with poly(arylene ether). Example 2 shows a increase in flammability and a decrease in impact strength. Examples 3 and 4 are also comparative examples in that they incorporate poly(arylene ether) and polysiloxane as individual polymers—not as a copolymer. Again, flammability is increased compared to Example 1 and impact strength is decreased. Examples 5 to 8 are inventive examples and show the surprising effect of including a poly(arylene ether)-siloxane copolymer (PPE-Si). The inventive examples show a marked decrease in flammability at both 0.8 mm and 0.6 mm thicknesses and an increase HDT. The inventive examples also show a marked decrease in melt viscosity compared to Examples 1 and 2. The improvement in melt viscosity means that thin, complex parts are easier to fill. This in tandem with the decreased flammability at smaller thicknesses is a surprising and highly useful combination of properties. Additionally, impact strength and spiral flow is improved in some examples and HDT is improved in all inventive examples when compared to Example 1.

EXAMPLES 9-20

The compositions as shown in Table 3 were made by melt mixing in a twin-screw lab scale extruder as described above. The amounts in Table 3 are shown in weight percent based on the total weight of the composition. In addition to the components shown in the Table 3 each example also contained 0.5 weight percent of stabilizers.

TABLE 3

|  | 9* | 10 | 11 | 12 | 13* | 14* | 15 | 16* | 17 | 18* | 19 | 20 |
|---|---|---|---|---|---|---|---|---|---|---|---|---|
| PC-1 | 5.7 | 5.7 | 5.7 | 5.7 | 5.7 | 5.7 | 5.7 | 5.7 | 5.7 | 5.7 | 5.7 | 5.7 |
| PC-2 | 66.8 | 67.6 | 59.3 | 51.8 | 69.3 | 66.3 | 66.0 | 59.3 | 69.2 | 69.3 | 64.8 | 65.2 |
| ABS (bulk) | 3.0 | 9.1 | 10.0 | 10.0 | 10.0 | 5.0 | 7.4 | 5.0 | 7.8 | 5.0 | 7.0 | 5.0 |
| RDP | 9 | 7.4 | 8.6 | 8.6 | 4.3 | 2.6 | 5.6 | 8.6 | 7.3 | 8.6 | 4.9 | 5.1 |
| PC-ST | 14.0 | 2.4 | 5.0 | 20.0 | 0.0 | 20.0 | 9.6 | 20.0 | 6.4 | 0.0 | 10.7 | 13.4 |
| PPE-Si (Solution) (70/30) | 0.0 | 6.5 | 10.0 | 2.5 | 10.0 | 0.0 | 4.9 | 0.0 | 2.4 | 10.0 | 6.2 | 4.8 |
| TSAN | 1.0 | 1.0 | 1.0 | 1.0 | 1.0 | 1.0 | 1.0 | 1.0 | 1.0 | 1.0 | 1.0 | 1.0 |
| Total siloxane content | 2.8 | 2.43 | 4 | 4.75 | 3 | 4 | 3.39 | 4 | 2 | 3 | 4 | 4.12 |
| UL 94 rating at 0.8 mm thickness | V0 | V0 | V0 | V0 | V2 | V0 | V0 | V0 | V0 | V0 | V1 | V0 |
| Total (t1 + t2) in seconds | 22 | 36 | 31 | 32 | 42 | 33 | 48 | 14 | 26 | 27 | 98 | 39 |
| UL 94 rating at 1.0 mm thickness | NT | V0 | V0 | V0 | V2 | V0 | V0 | V0 | V0 | V0 | V1 | V0 |
| Total (t1 + t2) in seconds | NT | 33 | 17 | 20 | 41 | 27 | 25 | 23 | 19 | 19 | 45 | 32 |
| UL 94 rating at 1.2 mm thickness | NT | V0 | V0 | V0 | V2 | V0 | V0 | V0 | V0 | V0 | V1 | V0 |
| Total (t1 + t2) in seconds | NT | 28 | 27 | 19 | 43 | 36 | 44 | 13 | 23 | 14 | 68 | 26 |
| UL 94 rating at 1.5 mm thickness | NT | V0 | V0 | V0 | V0 | V0 | V0 | V0 | V0 | V0 | V0 | V0 |
| Total (t1 + t2) in seconds | NT | 15 | 18 | 16 | 34 | 12 | 24 | 11 | 12 | 11 | 27 | 14 |
| Melt viscosity | 140 | 52.6 | NT | 113.6 | 45.6 | NT | 100.9 | NT | 113.7 | 47.0 | 102.8 | 128.0 |
| Spiral flow | 474 | 812.5 | 835.0 | 711.3 | 791.7 | 440.0 | 677.5 | 690.0 | 724.0 | 886.3 | 731.3 | 630.0 |
| NII | 9 | 13.6 | 10.5 | 39.9 | 22.0 | 61.7 | 18.6 | 39.4 | 12.1 | 11.0 | 26.8 | 42.4 |
| UNI | NB | 149.0 | 60.5 | NB | 56.6 | NB | NB | NB | NB | 44.0 | NB | NB |
| HDT | 83 | 83.3 | NT | 80.3 | 94.2 | 101.8 | 88.9 | 84.6 | 89.3 | 82.4 | NT | 94.7 |
| Tensile modulus | NT | 2.5 | 2.4 | 2.5 | 2.3 | 2.3 | 2.5 | 2.7 | 2.7 | 2.5 | 2.4 | 2.5 |
| Stress at yield | NT | 57.2 | 56.3 | 57.3 | 53.7 | 57.9 | 60.0 | 63.0 | 63.0 | 59.2 | 59.3 | 60.3 |
| Elongation at break | NT | 13.4 | 6.1 | 65.6 | 5.4 | 19.1 | 32.8 | 24.3 | 61.8 | 6.0 | 23.3 | 49.9 |

*Comparative Example

Examples 9 to 20 explore the effect of total siloxane content (from PC-ST and PPE-Si) and the relative amounts of two siloxane containing copolymers. Example 9 is a comparative example which contains no PPE-Si. Example 10, which contains 14% less total siloxane and 18% less RDP compared to Example 9, has comparable flame retardance but a greatly decreased melt viscosity, a higher spiral flow, and increased notched Izod impact strength. The remaining examples show that flame retardance can be achieved in combination with other desirable physical properties.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A thermoplastic composition comprising:
    30 to 85 weight percent of a polycarbonate, based on the total weight of the composition;
    an impact modifier;
    a polycarbonate-polysiloxane copolymer;
    a poly(arylene ether)-polysiloxane copolymer;
    an organophosphate in an amount of 2 to 20 weight percent based on the combined weight of polycarbonate, impact modifier, polycarbonate-polysiloxane copolymer and poly(arylene ether)-polysiloxane copolymer,
    wherein the composition has a notched Izod impact strength of greater than or equal to 4 kilojoules per square meter (kJ/m2) as determined according to ISO 180/A, a melt viscosity rate of less than or equal to 130 Pascal seconds (Pa s) as determined according to ISO 11443 at 1500 s-1 and 280° C., and a UL 94 rating of V1 or better at 0.8 millimeter thickness.

2. The thermoplastic composition of claim 1, wherein the composition has a notched Izod impact strength of greater than or equal to 6 kilojoules per square meter (kJ/m$^2$) as determined according to ISO 180/A.

3. The thermoplastic composition of claim 1, wherein the composition has a notched Izod impact strength of greater than or equal to 10 kilojoules per square meter (kJ/m2) as determined according to ISO 180/A.

4. The thermoplastic composition of claim 1, wherein the composition has a UL94 rating of V1 or better at 0.6 millimeters thickness.

5. The thermoplastic composition of claim 1, wherein the composition has a heat deflection temperature of greater than or equal to 80° C. as determined by ISO 75/A.

6. The thermoplastic composition of claim 1, wherein the impact modifier comprises methyl methacrylate-butadiene-styrene; acrylonitrile-butadiene-styrene, acrylonitrile-styrene-butyl acrylatemethyl, methacrylate-acrylonitrile-butadiene-styrene, acrylonitrile-ethylene-propylene-diene-styrene, or a combination of two or more of the foregoing.

7. The thermoplastic composition of claim 1, wherein the composition comprises the impact modifier in an amount of 1 to 15 weight percent, based on the total weight of the composition.

8. The thermoplastic composition of claim 1, wherein the composition comprises the polycarbonate-polysiloxane copolymer in an amount of 2 to 25 weight percent, based on the total weight of the composition.

9. The thermoplastic composition of claim 1, wherein the poly(arylene ether)-polysiloxane block copolymer comprises polysiloxane in an amount of 5 to 50 weight percent, based on the total weight of the copolymer.

10. The thermoplastic composition of claim 1, wherein the composition comprises the poly(arylene ether)-polysiloxane copolymer in an amount of 2 to 20 weight percent based on the total weight of the composition.

11. The thermoplastic composition of claim 1, wherein the composition has a total siloxane content of 1 to 10 weight percent based on the total weight of the composition.

12. A thermoplastic composition comprising:
    30 to 85 weight percent of a polycarbonate;
    1 to 15 weight percent of an impact modifier;
    2 to 25 weight percent of a polycarbonate-polysiloxane copolymer;
    2 to 20 weight percent of a poly(arylene ether)-polysiloxane copolymer;
    2 to 20 weight percent of an organophosphate, wherein weight percent is based on total weight of the composition,
    wherein the composition has a notched Izod impact strength of greater than or equal to 4 kilojoules per square meter (kJ/m2) as determined according to ISO 180/ A, a melt viscosity rate of less than or equal to 130 Pascal seconds (Pa s) as determined according to ISO11443 at 1500 s-1 and 280° C., and a UL 94 rating of V1 or better at 0.6 millimeter thickness.

13. A thermoplastic composition comprising:
    30 to 85 weight percent of a bis-phenol A polycarbonate;
    1 to 15 weight percent of a bulk polymerized acrylonitrile-butadiene-styrene copolymer;
    2 to 25 weight percent of a polycarbonate-polysiloxane copolymer;
    2 to 20 weight percent of a poly(arylene ether)-polysiloxane copolymer having a siloxane content of 25 to 35 weight percent based on the total weight of the copolymer;
    2 to 20 weight percent of an organophosphate, wherein weight percent is based on total weight of the composition,
    wherein the composition has a notched Izod impact strength of greater than or equal to 4 kilojoules per square meter (kJ/m2) as determined according to ISO 180/A, a melt viscosity rate of less than or equal to 130 Pascal seconds (Pa s) as determined according to ISO11443 at 1500 s-1 and 280° C., and a UL94 rating of V1 or better at 0.6 millimeter thickness.

* * * * *